United States Patent
Niven-Jenkins et al.

(10) Patent No.: US 8,538,260 B2
(45) Date of Patent: *Sep. 17, 2013

(54) WAVELENGTH SELECTION

(75) Inventors: Benjamin P Niven-Jenkins, Ipswich (GB); John R King, Saxmundham (GB)

(73) Assignee: British Telecommunications Public Limited Company, London (GB)

( * ) Notice: Subject to any disclaimer, the term of this patent is extended or adjusted under 35 U.S.C. 154(b) by 1105 days.

This patent is subject to a terminal disclaimer.

(21) Appl. No.: 11/632,531

(22) PCT Filed: Jul. 12, 2005

(86) PCT No.: PCT/GB2005/002728
§ 371 (c)(1),
(2), (4) Date: Jan. 17, 2007

(87) PCT Pub. No.: WO2006/008460
PCT Pub. Date: Jan. 26, 2006

(65) Prior Publication Data
US 2008/0056717 A1 Mar. 6, 2008

(30) Foreign Application Priority Data
Jul. 19, 2004 (GB) .................................. 0416107.1

(51) Int. Cl.
*H04J 14/00* (2006.01)
(52) U.S. Cl.
USPC ......................................................... 398/57
(58) Field of Classification Search
USPC ....................................................... 398/166
See application file for complete search history.

(56) References Cited

U.S. PATENT DOCUMENTS

| 4,731,878 | A  | * | 3/1988 | Vaidya .......................... 398/166 |
| 5,586,128 | A  | * | 12/1996 | Chen ............................. 714/792 |
| 6,476,945 | B1 | * | 11/2002 | Archambault ................... 398/59 |
| 6,738,354 | B1 | * | 5/2004 | Ashwood Smith ........... 370/248 |
| 6,763,190 | B2 | * | 7/2004 | Agrawal et al. ................... 398/5 |
| 6,775,230 | B1 |   | 8/2004 | Watanabe et al. |
| 6,850,705 | B2 | * | 2/2005 | Su et al. ............................ 398/5 |
| 7,113,481 | B2 | * | 9/2006 | Elie-Dit-Cosaque et al. 370/238 |
| 7,171,124 | B2 | * | 1/2007 | Smith et al. ...................... 398/97 |
| 7,224,897 | B1 | * | 5/2007 | Slezak et al. ...................... 398/5 |
| 7,249,169 | B2 | * | 7/2007 | Blouin et al. ................. 709/220 |
| 7,283,741 | B2 | * | 10/2007 | Sadananda ........................ 398/5 |

(Continued)

FOREIGN PATENT DOCUMENTS

| EP | 1278325 | 1/2003 |
| EP | 1499054 | 6/2004 |

(Continued)

OTHER PUBLICATIONS

International Search Report dated Aug. 18, 2005.

(Continued)

*Primary Examiner* — Danny Leung
(74) *Attorney, Agent, or Firm* — Patterson Thuente Pedersen, P.A.

(57) ABSTRACT

A wavelength is selected for use in transmitting optical data along a path in an optical network. Wavelengths that are available for use end-to-end along the path are found, the wavelengths that are available on each link attached to each node on the path are found and a wavelength that is available end-to-end and that is more available on the links attached to the nodes is selected.

16 Claims, 9 Drawing Sheets

(56) References Cited

U.S. PATENT DOCUMENTS

| | | | |
|---|---|---|---|
| 7,289,730 B2* | 10/2007 | Matsuura et al. | 398/57 |
| 7,539,210 B2* | 5/2009 | Iovanna et al. | 370/468 |
| 7,599,621 B2* | 10/2009 | Guy et al. | 398/57 |
| 2002/0030867 A1* | 3/2002 | Iannone et al. | 359/124 |
| 2002/0093703 A1* | 7/2002 | Maeno | 359/110 |
| 2002/0145783 A1* | 10/2002 | Chang et al. | 359/128 |
| 2002/0191247 A1* | 12/2002 | Lu et al. | 359/124 |
| 2003/0016414 A1* | 1/2003 | Solheim et al. | 359/127 |
| 2003/0030866 A1* | 2/2003 | Yoo | 359/128 |
| 2003/0161632 A1* | 8/2003 | Wang | 398/48 |
| 2003/0198227 A1* | 10/2003 | Matsuura et al. | 370/395.2 |
| 2004/0022194 A1 | 2/2004 | Ricciulli | |
| 2004/0120705 A1* | 6/2004 | Friskney et al. | 398/5 |
| 2004/0208504 A1* | 10/2004 | Solheim et al. | 398/16 |
| 2004/0220886 A1* | 11/2004 | Kumaran et al. | 705/400 |
| 2004/0246896 A1* | 12/2004 | Hoang et al. | 370/230 |
| 2004/0246912 A1* | 12/2004 | Hoang et al. | 370/254 |
| 2004/0246973 A1* | 12/2004 | Hoang et al. | 370/395.21 |
| 2004/0258409 A1* | 12/2004 | Sadananda | 398/50 |
| 2005/0008367 A1* | 1/2005 | Laalaoua | 398/49 |
| 2005/0069314 A1* | 3/2005 | De Patre et al. | 398/5 |
| 2005/0069316 A1* | 3/2005 | Vigoureux et al. | 398/49 |
| 2006/0002716 A1* | 1/2006 | Guy et al. | 398/175 |
| 2006/0188252 A1* | 8/2006 | Schluter | 398/25 |
| 2008/0037982 A1* | 2/2008 | Niven-Jenkins et al. | 398/25 |
| 2008/0056717 A1* | 3/2008 | Niven-Jenkins et al. | 398/57 |
| 2009/0060505 A1* | 3/2009 | Bernstein et al. | 398/48 |

FOREIGN PATENT DOCUMENTS

| | | |
|---|---|---|
| JP | 2002-064529 | 2/2002 |
| WO | WO 03/079596 A | 9/2003 |
| WO | WO/2004/002078 | * 12/2003 |

OTHER PUBLICATIONS

Bagchi, "Route Selection with Multiple Metrics", Information Processing Letters, Amsterdam, NO, vol. 64, No. 4, Nov. 1997, pp. 203-205, XP000669933.

Office Action mailed Aug. 20, 2009, in U.S. Appl. No. 11/632,533.

Application and File History of U.S. Appl. No. 11/632,533, Inventors: Niven-Jenkins et al., filed Jan. 17, 2007.

International Search Report mailed Oct. 21, 2005, International Application No. PCT/GB2005/002736, 2 pages.

Japanese Office Action dated Apr. 21, 2010, Japanese Application No. 2007-522008, 2 pages.

Japanese Office Action dated Oct. 1, 2010, Japanese Application No. 2007-522008, 2 pages.

\* cited by examiner

🞅 Path Computation Function
🞅 Optical Cross Connect
══ Fibre Link with Management/
     Control Wavelength (in white)

🞅 Path Computation Function
🞅 Optical Cross Connect
══ Fibre Link with Management/
     Control Wavelength (in white)

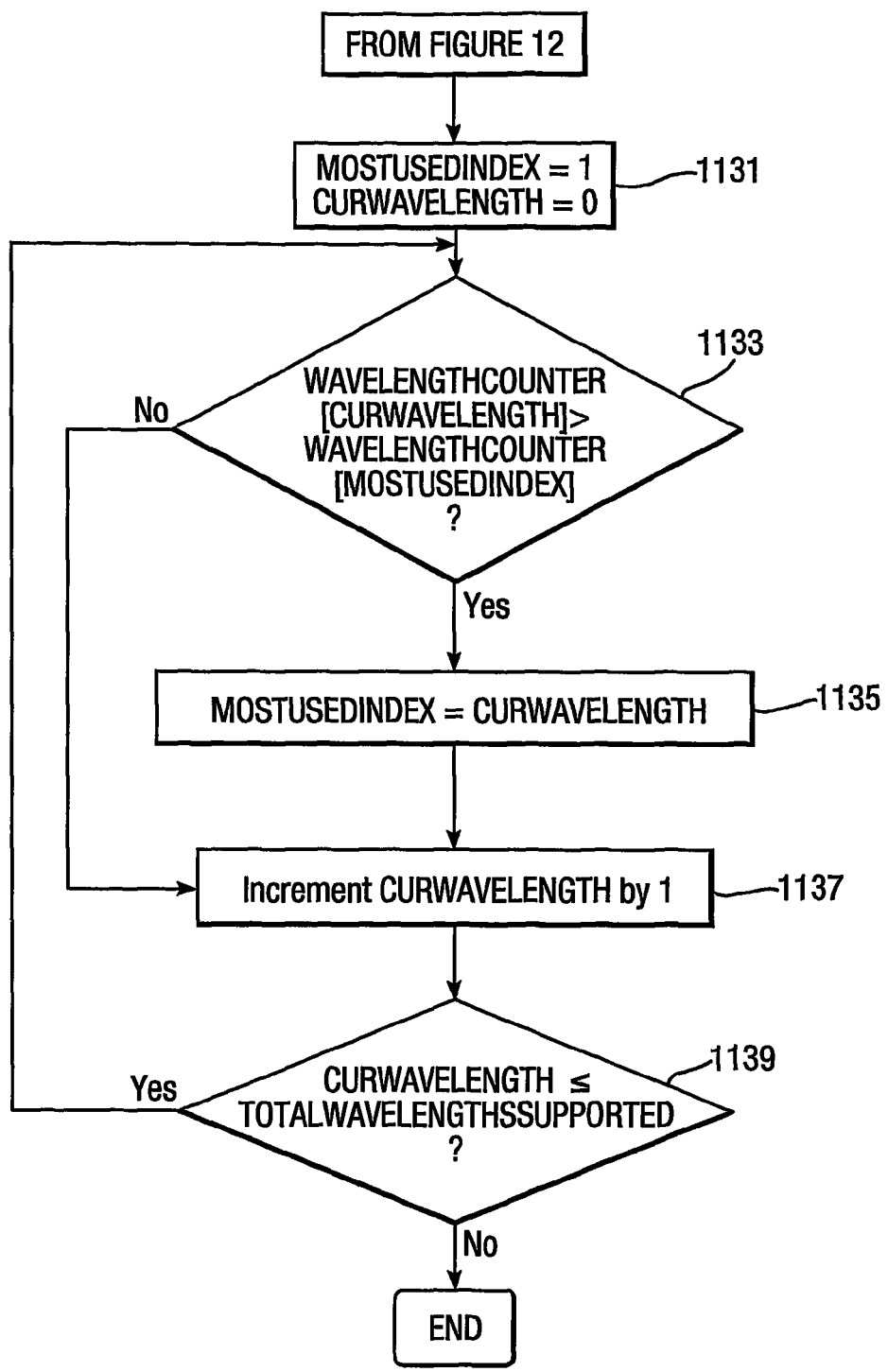

WAVELENGTH SELECTION

CROSS-REFERENCE TO RELATED APPLICATIONS

This application is the US national phase of international application PCT/GB2005/002728 filed 12 Jul. 2005 which designated the U.S. and claims benefit of GB 0416107.1, dated 19 Jul. 2004, the entire contents of both of which are hereby incorporated by reference. This application is also related to my commonly assigned, copending application Ser. No. 11/632,533 filed Jan. 17, 2007.

BACKGROUND

1. Technical Field

This invention relates to a method of selecting a wavelength for use in transmitting optical data along a path in an optical network.

2. Related Art

In an optical network, data is transmitted over optical fibres that interconnect network nodes (commonly called routers or switches). As data traverses the network it will traverse one or more network nodes. At each network node data is received on an input port, converted from an optical signal to an electrical signal, processed in the electrical domain, converted from an electrical to an optical signal and transmitted on the relevant output port. This conversion from an optical signal to an electrical signal and back again is called Optical-Electrical-Optical (OEO) conversion.

There are two main consequences of having OEO conversion at every node. Firstly, OEO conversion re-shapes, re-times and re-transmits the optical signal at every node meaning that each link in an end-to-end path can be considered in isolation and any fault or impairment on one link does not have a knock-on affect on subsequent links. Secondly, OEO conversion enables a node to receive an optical signal on a given wavelength and re-transmit it on a different wavelength, i.e. the nodes can perform wavelength conversion. However, OEO conversion is expensive to implement and acts as a bottleneck in the network because the maximum speed at which data can be switched from an input port to an output port depends on how fast the underlying electronics in each network node can operate.

In an all-optical network, data is also transmitted over optical fibres that interconnect network nodes. However at each network node, data is received on an input port, switched in the optical domain and transmitted on the relevant output port without any OEO conversion taking place. The lack of OEO conversion in all optical networking nodes (more commonly called optical cross connects (OXCs)) results in the cost of networking nodes being reduced. It is usual in an all optical network for several different wavelengths to be used simultaneously on each optical fibre by utilizing wavelength division multiplexing (WDM).

The lack of OEO conversion in an all-optical node means that nodes can no longer perform wavelength conversion so it is necessary to use the same wavelength along the entire end to end path. This is known as the wavelength continuity constraint and can result in a situation where an end-to-end path is not usable because despite the network having spare capacity (i.e. wavelengths that are not being used to transmit data), there is no one common wavelength available on all the links on the end-to-end path.

Current methods of selecting a wavelength for use in transmitting data involve considering all the wavelengths available for use on each link that actually constitutes the path and selecting one that is available end-to-end. In one such method, all the wavelengths on a link are sequentially numbered and the wavelength with the lowest number that is available end-to-end is chosen. A disadvantage associated with these methods is that they do not consider how a wavelength selection decision will affect future connection attempts along paths that have one or more links in common with the path for which the wavelength is being selected. As a result, a future connection attempt may be blocked because there are no wavelengths available end-to-end along the entire path that is to be set up.

BRIEF SUMMARY

An optimal (but intractable) method of wavelength selection considers which wavelengths are available in the entire network when making wavelength selection decisions. Such a method would be able to consider how a wavelength selection decision will affect future connection attempts using any link in the network.

According to a first aspect of the present invention, there is provided a method of selecting a wavelength for use in transmitting optical data along a path in an optical network, said optical network comprising a plurality of nodes interconnected by optical fibre links, said method comprising:

finding the wavelengths available for use end-to-end along said path;

finding the wavelengths available on each link attached to each node on said path;

selecting a wavelength that is available end-to-end and that is more available on the links attached to the nodes on said path than other wavelengths.

By finding the wavelengths available for use end-to-end along a selected path and by finding the wavelengths available for use on each link attached to each node on the selected path and by selecting a wavelength that is available end-to-end and that is also more available on the links attached to the nodes on the selected path than other wavelengths, better decisions regarding which wavelength to select for use are made and the success-rate of path set-up attempts is improved.

The invention provides a method that is able to consider how a wavelength selection decision will affect future path set-up attempts along paths that have one or more links in common with the path for which the wavelength is being selected. Thus the situation described above where path set-up attempts are blocked will be delayed and there will be more successful paths set up for a similar number of attempts. Selecting a wavelength that is widely available on the links attached to the nodes on the path for which the wavelength is being selected is less likely to lead to a subsequent blocked path set-up attempt than selecting a wavelength that is not widely available. As a result, more end-to-end paths can be set-up for a given number of deployed wavelengths and fibres, which enables higher utilization of the available network capacity.

Other aspects of the present invention are defined in the claims.

BRIEF DESCRIPTION OF THE DRAWINGS

Embodiments of the present invention will now be described, by way of example only, with reference to the accompanying drawings, wherein like reference numbers refer to like parts, and in which:

FIGS. 11 to 13 are flowcharts describing the steps in a Wavelength Selection algorithm.

DETAILED DESCRIPTION OF EXEMPLARY EMBODIMENTS

Figures 1, 2:
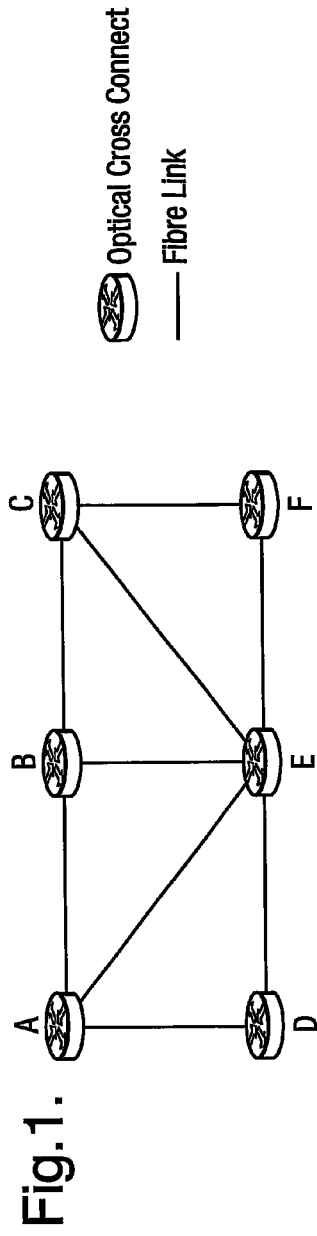
FIG. 1 shows an optical network.
FIG. 2 is a table detailing various characteristics of the nodes and links which comprise the optical network of FIG. 1.

FIG. 1 shows an all-optical network comprising six optical network nodes (A, B, C, D, E & F) more often known as optical cross connects or OXCs. A suitable OXC currently available is the λNODE available from λOpticalSystems of Reston, Va., USA. Data is transmitted at a specific wavelength over optical fibre links that interconnect the OXCs. Each direction of the optical fibre links is considered to be a separate, uni-directional link. At each OXC, data is received on an input port, switched in the optical domain and transmitted on the relevant output port without any optical-electrical-optical conversion taking place. Several different wavelengths may be used simultaneously on each optical fibre link by utilizing wavelength division multiplexing (WDM). The number of wavelengths that can be supported per optical fibre link is dependent on the exact nature of the network deployed and would be decided at the network planning stage (e.g. how much does the deployer of the network want to pay, how much bandwidth is required etc.) Optical networks are known to those skilled in the art that can support up to 160 wavelengths per optical fibre link; however, in the network of FIG. 1 each optical fibre link can support a maximum of 5 wavelengths in each direction. It is important to note that not every optical fibre link and also not each direction of a single optical fibre link has to support the same number of wavelengths; the table in FIG. 2 illustrates the number of wavelengths available on each optical fibre link of the network of FIG. 1. For example, there are 5 wavelengths available on the optical fibre link AB that connects OXC A to OXC B, 3 wavelengths available on the optical fibre link CE that connects OXC C to OXC E and no wavelengths available on the optical fibre link BE that connects OXC B to OXC E. Availability of less than the maximum of 5 wavelengths may be due to technological constraints (i.e. a particular link can only support 3 wavelengths, for example) or due to usage (i.e. a particular link can support up to 5 wavelengths but 3 are already in use and therefore only 2 wavelengths are available). Additionally, FIG. 2 also includes a wavelength vector (WAVELENGTHS) for each optical fibre link, where a 1 indicates that a wavelength is available and a 0 indicates that a wavelength is not available. The wavelengths are labelled 0 to 4 where wavelength 0 is the first wavelength in the vector (the left hand bit in the vector) and wavelength 4 is the last wavelength in the vector (the right hand bit in the vector). These numbers map directly to real wavelength values (e.g. wavelength 0 maps to a wavelength of 1510 nm). In the example cited previously, wavelengths 0 to 4 are available on link AB (illustrated by the vector {11111}), wavelengths 0, 3 and 4 are available on link CE (illustrated by the vector {10011}) and no wavelengths are available on link BE (illustrated by the vector {00000}).

The network of FIG. 1 will normally also include a Network Management System (NMS) or Operational Support System (OSS). The NMS/OSS is used to perform various tasks, which typically include but are not limited to: configuration management to monitor network & system configuration and possibly to re-configure devices as required; fault management to detect, log and notify users of, and possibly fix network problems and/or faults; performance management and accounting to measure network performance against agreed service level agreements, regulate bandwidth/usage quotas and produce billing information.

Figure 3:
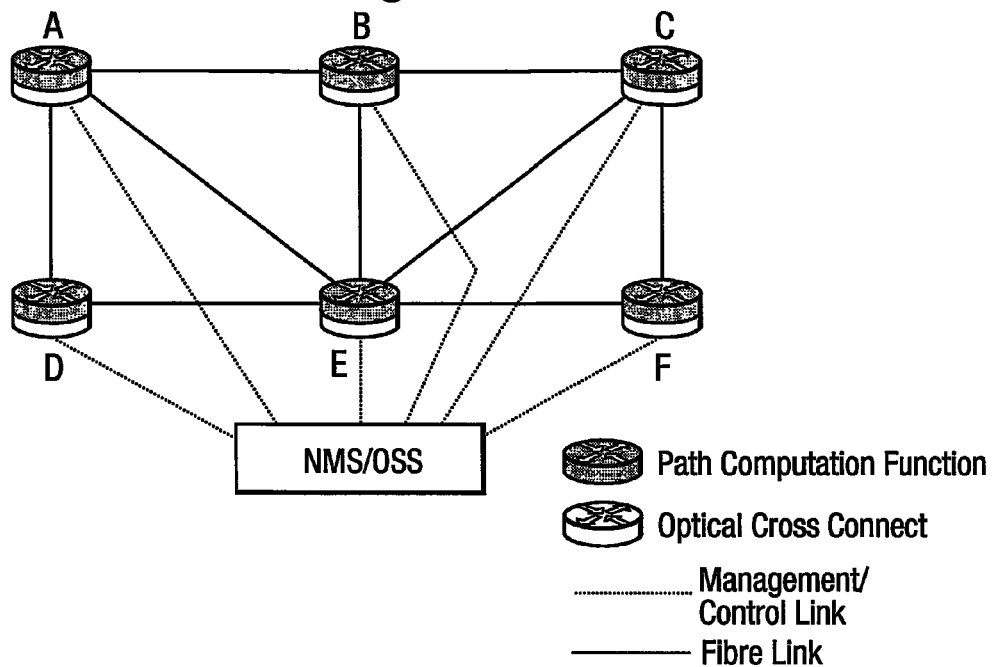
FIGS. 3 to 8 show different configurations of the optical network of FIG. 1.
Figure 4:
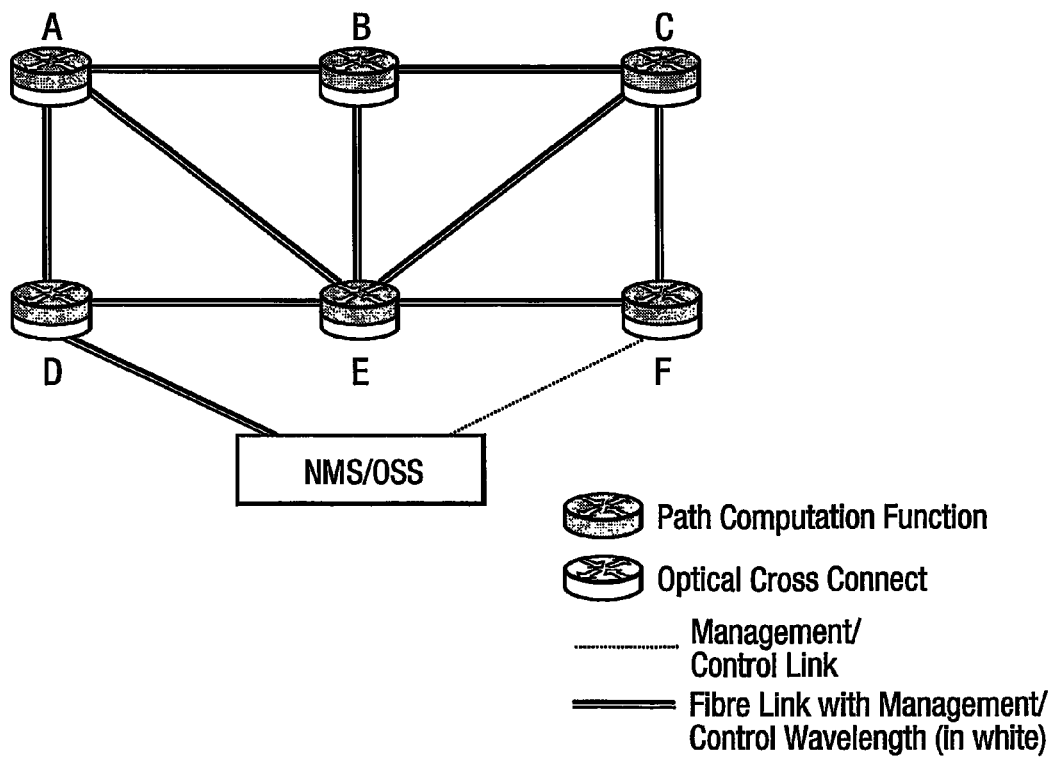

An NMS/OSS is shown in FIGS. 3 and 4 attached to the optical network of FIG. 1. The NMS/OSS is normally attached via an Out of Band (OOB) network, which could involve an additional physical network comprising management/control links connecting the NMS/OSS individually to each OXC in the network, as shown in FIG. 3. Alternatively, a wavelength on each of the fibre links interconnecting the OXCs could be reserved for management/control traffic, as shown in FIG. 4. In this case, the NMS/OSS will still need to be connected to the network and this can be done via a dedicated link (e.g. the NMS/OSS to OXC F link) or via a dedicated wavelength on a fibre link (e.g. the NMS/OSS to OCX D link). Usually, the NMS/OSS will be connected to the network at more than one point for resiliency.

In order to set up a connection between two OXCs in the optical network, a path through the network has to be selected and a wavelength must be assigned to that path. For example, in the network of FIG. 1, in setting up a connection between OXC A and OXC F, there are 10 possible paths (ABCF, ABEF, ABECF, ABCEF, ADEF, ADECF, ADEBCF, AEF, AECF and AEBCF) and 5 possible wavelengths. One of these paths and one of these wavelengths must be selected. Path selection is accomplished with a Path Selection algorithm and Wavelength Selection is accomplished with a Wavelength Selection algorithm. The exact details of the Path Selection and Wavelength Selection algorithms used in the present embodiment will be given later.

In the examples of FIGS. 3 and 4, the first node on the path (the connection's ingress node) will run the Path Selection and Wavelength Selection algorithms thus calculating the path (and wavelength) to be used, and will subsequently communicate this information along the path using an appropriate signaling protocol. For example, if a connection was requested between OXCs A and F, OXC A would run the algorithms (hence selecting the path and wavelength) and subsequently communicate this information along the path. The actual signaling protocol used will depend on factors such as networking technology, personal preference etc. Those skilled in the art will have no difficulty in providing and implementing a suitable signaling protocol. Since connections can potentially start from any node in the network (i.e. any node can be an ingress node), all the OXCs in the network have path computation functionality and hence the algorithms can be run on any of the OXCs in the network. No additional hardware is needed over and above what is already present within an OXC. The OXC only needs to know what wavelengths are in use on each of the fibre links and this information can be derived because the system knows how many wavelengths were configured at start-up and which wavelengths have been assigned since start-up.

Figure 5:
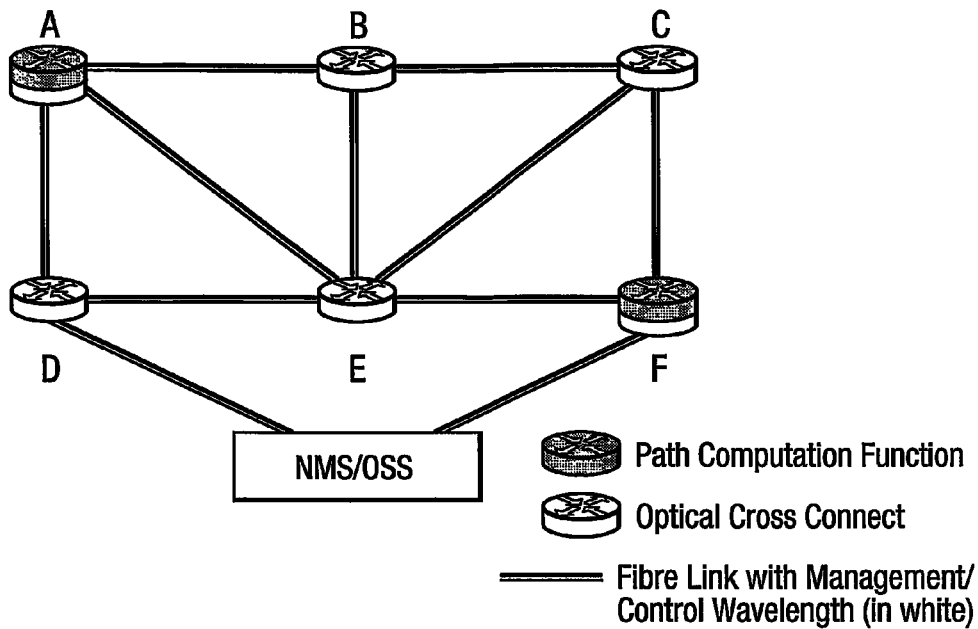
Figure 6:
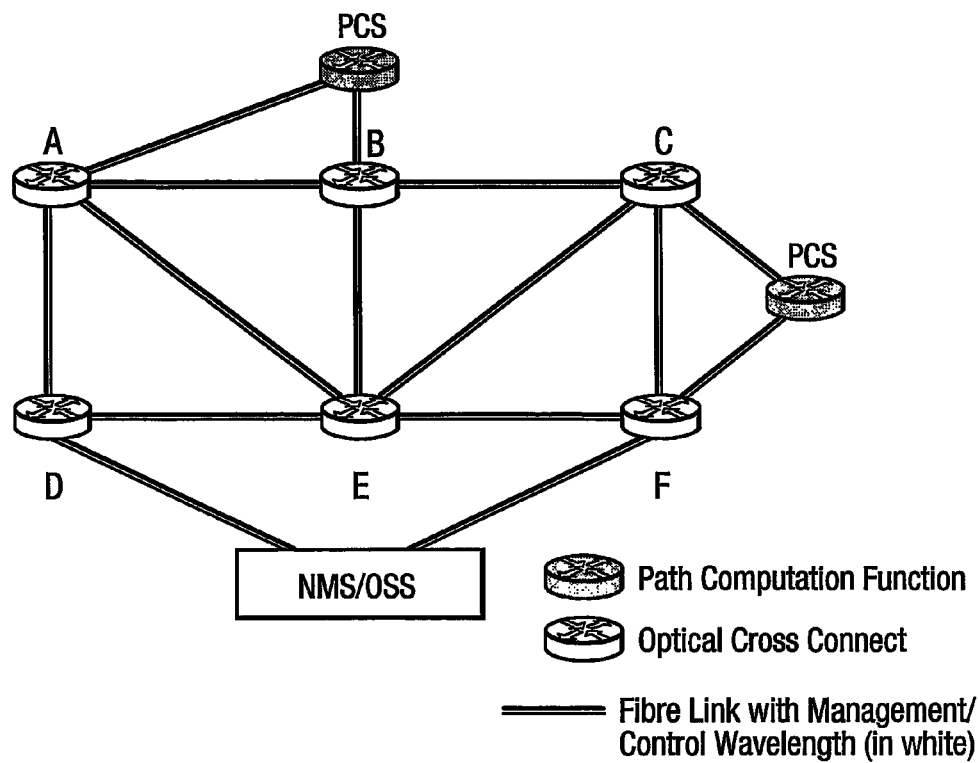

In alternative embodiments, the algorithms (and therefore path and wavelength selection) can be run on a path computation server (PCS). Referring to FIGS. 5 and 6, when a connection is requested between OXCs A and F, OXC A will request a path (and wavelength) from the PCS, the PCS will return the preferred path and wavelength to node A and node A will signal and set up the connection using an appropriate signaling protocol as previously described. The PCS could be a dedicated server attached to the network that only performs path computations (as shown in FIG. 6) or, alternatively, path computation functionality could be added to an existing OXC in the network (as shown in OXCs A and F in FIG. 5). A given network may have more than one PCS for reasons such as resiliency, scalability etc.

Figure 7:
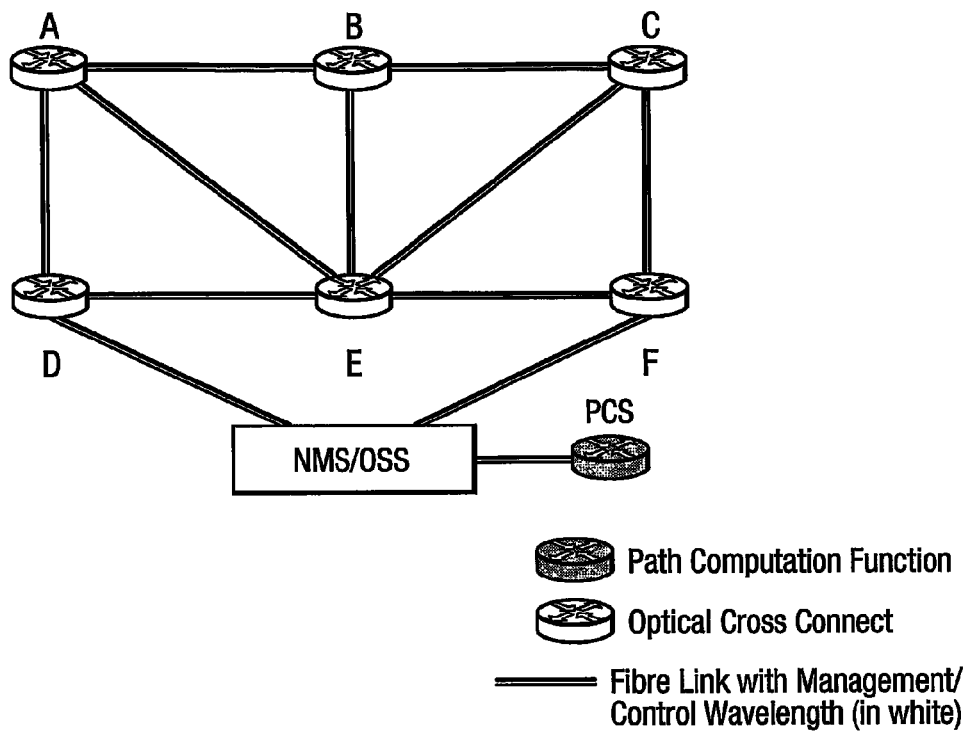
Figure 8:
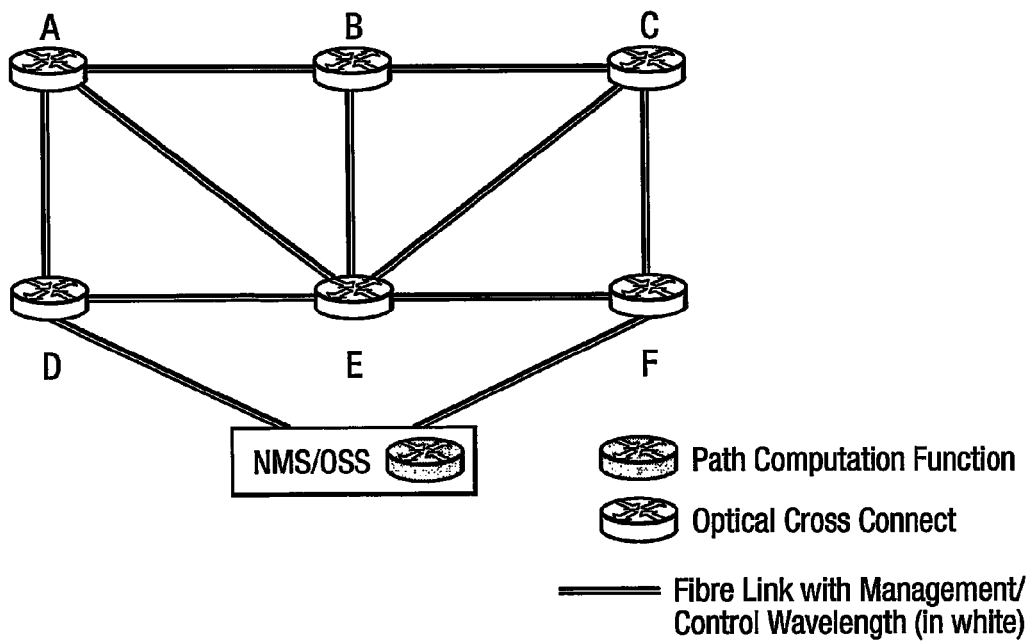

In other embodiments, the algorithms (and therefore path and wavelength selection) can be run on a PCS as previously described but the PCS can either be connected to the NMS/OSS (as shown in FIG. 7) or it can be integrated into the NMS/OSS (as shown in FIG. 8). In both cases, the NMS/OSS requests paths/connections from the PCS which returns them to the NMS/OSS. The NMS/OSS then configures the OXCs on the selected path directly. A given network may have more than one PCS for reasons such as resiliency, scalability etc.

As mentioned above, for a given communication, data is transmitted through the optical network of FIG. 1 at a specific wavelength over optical fibre links that interconnect the OXCs. At each OXC, data is received on an input port, switched in the optical domain and transmitted on the relevant output port. There is an optical loss across each OXC, which is the loss associated with switching light of a given wavelength inside the OXC. Since no optical-electrical-optical conversion takes place inside an OXC, it is necessary to use the same wavelength across the entire end-to-end path. Since the degradation along the length of the path is the accumulation of the effect of faults/impairments at one OXC or on any one link on the path, examining the end-to-end optical loss across the entire path enables a determination of whether or not a path is usable to be made.

In order to determine whether the end-to-end optical loss across a path is acceptable and therefore whether a path is usable, an end-to-end viability check can be performed. The viability check uses physical characteristics of the end-to-end path; more specifically it combines the physical characteristics of each OXC and fibre link that constitute the path.

As the selected path is being built up (either using the path selection algorithm as will be described below or any alternative path selection algorithm) a link L can only be included in a path P (therefore extending the end-to-end path to include link L) if the path Q that is equal to the path P plus the link L (i.e. if P=XYZ, then Q=XYZL) passes an end to end viability test based on the physical (optical) characteristics of the path. If Q passes the end to end viability check, then path Q is optically viable and the link L can be used to extend path P. The end-to-end viability measure used in the present embodiment is:

PathLength=Total length of the path, equal to $$\sum_i LinkLength_i$$

where $LinkLength_i$ is the length (in km) of link i along the path.

TotalOXCLoss=Total optical loss due to the optical cross connects along the path, equal to $$\sum_k OXCLoss_k$$

where $OXCLoss_k$ is the optical loss (in dB) across OXC k along the Path. (Values can be obtained by through measurements/monitoring of the network.)

TotalPMD=Total amount of polarization mode dispersion (PMD) (in ps) end-to-end across the path, i.e. $\sqrt{(PMD_1^2+PMD_2^2+PMD_3^2+...+PMD_n^2)}$, where $PMD_n$ is the PMD across the $n^{th}$ link in the path. (PMD is an electromagnetic propagation phenomenon occurring in optical fibres that support two modes of propagation distinguished by their polarization. Because of optical birefringence in the fibre, the two modes travel with different velocities, and the random change of this birefringence along the fibre length results in random coupling between the modes. The resulting PMD leads to pulse distortion and system impairments that limit the transmission capacity of the fibre. Values can be obtained by through measurements/monitoring of the network.)

If M>0 then the path (Q or equivalently P+L) has passed the end-to-end viability test and is considered to be optically viable and able to support an optical trail.

If M<0 then the path (Q or equivalently P+L) has failed the test and is not optically viable and is not able to support an optical trail.

It is worth noting that the exact details of the end to end viability check (i.e. the exact formula used) for a given network will depend on a number of factors, including (but not limited to): what optical equipment is deployed in the network and how much of a error margin the network operator is willing to operate within. For example, a network operator may decide to only accept paths that they know for certain will be viable. Alternatively, a network operator might be less $$M = 2 - 10*\log_{10}\left(\frac{(FibreAttenuation*PathLength)+(TotalOXCLoss)}{FibreAttenuation*MaxPathLength}\right) - e^{\left(\frac{\ln(2)*TotalPMD}{10}\right)}$$

where:

FibreAttenuation=The attenuation (in dB/km) associated with the fibre links used in the network. (It is worth noting that in practice, this varies from fibre link to fibre link but in the present embodiment it is assumed not to vary from link to link). In preferred embodiments, individual fibre attenuations are summed.

MaxPathLength=The maximum length of path (in km) that the optical equipment in the network can support. This is usually a limit that is set by the optical equipment manufacturer and in the present embodiment, it is assumed that all the equipment in the network is from the same vendor or has the same maximum length limit.

fussy and be willing to accept paths that are 'borderline' because they may feel that the added revenue from being able to get some of these borderline connections to work outweighs the extra costs of dealing with the borderline connections that fail.

The end-to-end viability check can be implemented as follows:

Let P be a variable that stores the current preferred path (that is viable);

Let P.TotalPMD be a variable that stores the TotalPMD for the path P (where TotalPMD=$PMD_1^2+PMD_2^2+PMD_3^2+...+PMD_n^2$);

(It will be apparent that this formula for TotalPMD differs slightly from the formula given previously by the lack of a square root. The square root cannot be calculated until the sum of the squares of the PMD on each link in the path has been calculated. Since this sum is constantly changing (as new links are added to the path) the square root cannot be calculated until just before the viability measure is calculated. Hence the difference in the term including TotalPMD in the viability measure M that will be described later.)

Let P.TotalLength be a variable that stores the total length (in km) of the path P (i.e. PathLength above);

Let P.TotalOXCLoss be a variable that stores the total optical loss due to the optical cross connects along the path (i.e. TotalOXCLoss above);

Let Q be a variable that stores a temporary path (Q also contains the variables Q.TotalPMD, Q.TotalLength and Q.TotalOXCLoss with similar definitions as for P above);

Let L be a variable that stores the current preferred link that the path selection algorithm would use as the next link in the chosen path if no better candidate path is found;

Let L.PMD be a variable that stores the PMD across the link L;

Let L.Length be the length (in km) of the link L (more specifically the length in km of the fibre used to form link L);

Let L.OXCLoss be the optical loss across the OXCs associated with the link L (the present embodiment associates the optical loss across the downstream OXC with a given link, e.g. if a link L exists between nodes A and B, the OXCLoss associated with L is the loss across the OXC B).

Let MaxPathLength be a constant that holds the maximum length of path (in km) that the optical equipment in the network can support (i.e. MaxPathLength above); and Let FibreAttenuation be a constant that holds the attenuation associated with the fibre used in the network (i.e. FibreAttenuation above).

When the path selection algorithm is first run all variables start off with a value of zero (P starts off as an empty/blank path) and constants MaxPathLength and FibreAttenuation store their respective configured values. The path selection algorithm will select the link L which it would prefer to use as the first link in the path P. The end-to-end viability check is performed and calculated (and stored) as follows:

$Q.\text{Total}PMD=P.\text{Total}PMD+(L.PMD*L.PMD)$ $Q.\text{Total}Length=P.\text{Total}Length+L.Length$ $Q.\text{Total}OXCLoss=P.\text{Total}OXCLoss+L.OXCLoss$ $$M = 2 - 10*\log_{10}\left(\frac{(FibreAttenuation * Q.TotalLength) + Q.TotalOXCLoss}{FibreAttenuation * MaxPathLength}\right) - e^{\left(\frac{\ln 2 * \sqrt{Q.TotalPMD}}{10}\right)}$$

If (M>0) then let P=Q (i.e. extend path P with link L), The path selection algorithm then proceeds to select the next link in the path (more specifically, the preferred link selected by the path selection algorithm) and repeats the end-to-end viability check above for the path P+L.

If (M≦0) let P=P (i.e. do not extend path P with link L and instead repeat the viability check with the path selection algorithm's second choice/preference of link, if no link passes the validity check then there is not an end-to-end path available that is optically viable (therefore the connection attempt fails).

By performing an end-to-end viability check, it is possible to determine whether or not a selected path is usable and if not, select a different path that is usable. This is preferable to assuming that all paths are usable and then discovering after a path is selected that the chosen path is not usable, which adds to the operating costs of the network and may also involve manual intervention in an automatic provisioning process.

The Path Selection algorithm will now be described in more detail. The variables listed below are used in the description of the Path Selection algorithm and the associated flow charts in FIGS. 9 to 10.

NODEID[I]—Holds the NODEID for the I$^{th}$ node in the network. It is assumed that all nodes in the network are arbitrarily assigned sequential numbers in order to ease iterating through all the nodes in the network. NODEID[I] maps between a node's arbitrary number and its actual NODEID.

PATHSTART—Set to the NODEID of the first node on the path, i.e. the ingress node for the connection.

PATHEND—Set to the NODEID of the last node on the path, i.e. the egress node for the connection.

S—A set that holds the NODEIDs of nodes that have already been examined by the algorithm.

TOTALNUMNODES—Holds the total number of nodes in the network.

C[NODEID]—Holds the cost of the path between node PATHSTART and node NODEID.

PATH[NODEID]—Holds the shortest path between node PATHSTART and node NODEID. The shortest path is the path that has the lowest cost.

INTERFACES[NODEID]—Holds the number of links attached to node NODEID.

REMOTENODEID[NODEID][INTFACE]—Holds the NODEID of the node at the other end of the link INTFACE attached to node NODEID.

REMOTENODE—Holds the NODEID of the node at the other end of the link INTFACE attached to node NODEID that is currently being examined by the algorithm.

LINKCOST[NODEID][INTFACE]—Holds the cost of the link INTFACE attached to node NODEID.

The Path Selection algorithm is based on the well known Dijkstra Shortest Path Algorithm (Dijkstra, E. W, "*A note on two problems in connection with graphs,*" *Numerische Mathematik*, vol. 1, pp. 269-271, 1959) that is modified to calculate the cost of each link based on the physical characteristics of the link. In the preferred embodiment, the cost of link i, $LinkCost_i=WavelengthsAvailable_i^{-1}$, where $WavelengthsAvailable_i$ is the number of wavelengths available for use on link i.

Figure 9:
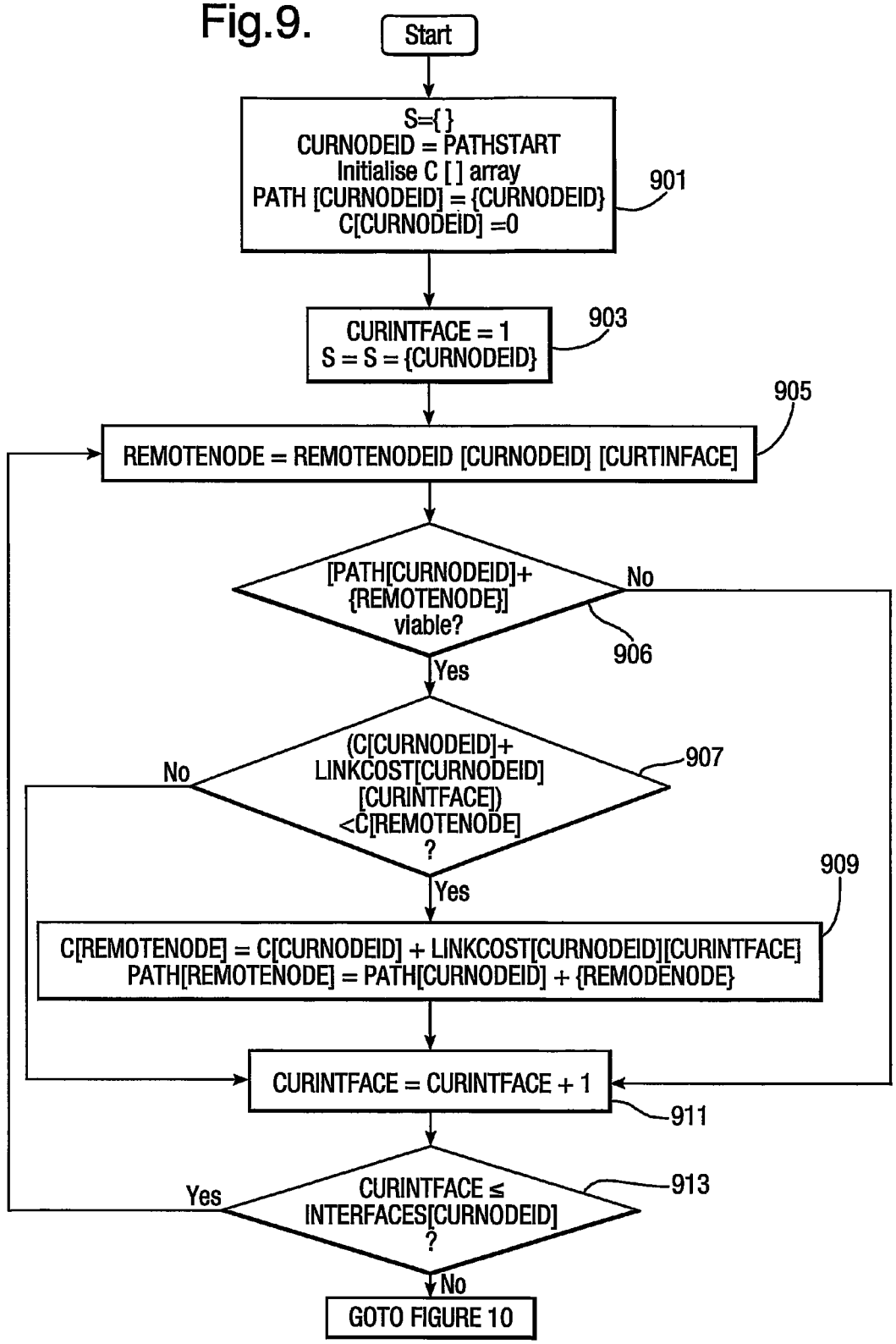
FIGS. 9 and 10 are flowcharts describing the steps in a Path Selection algorithm.
Figure 10:
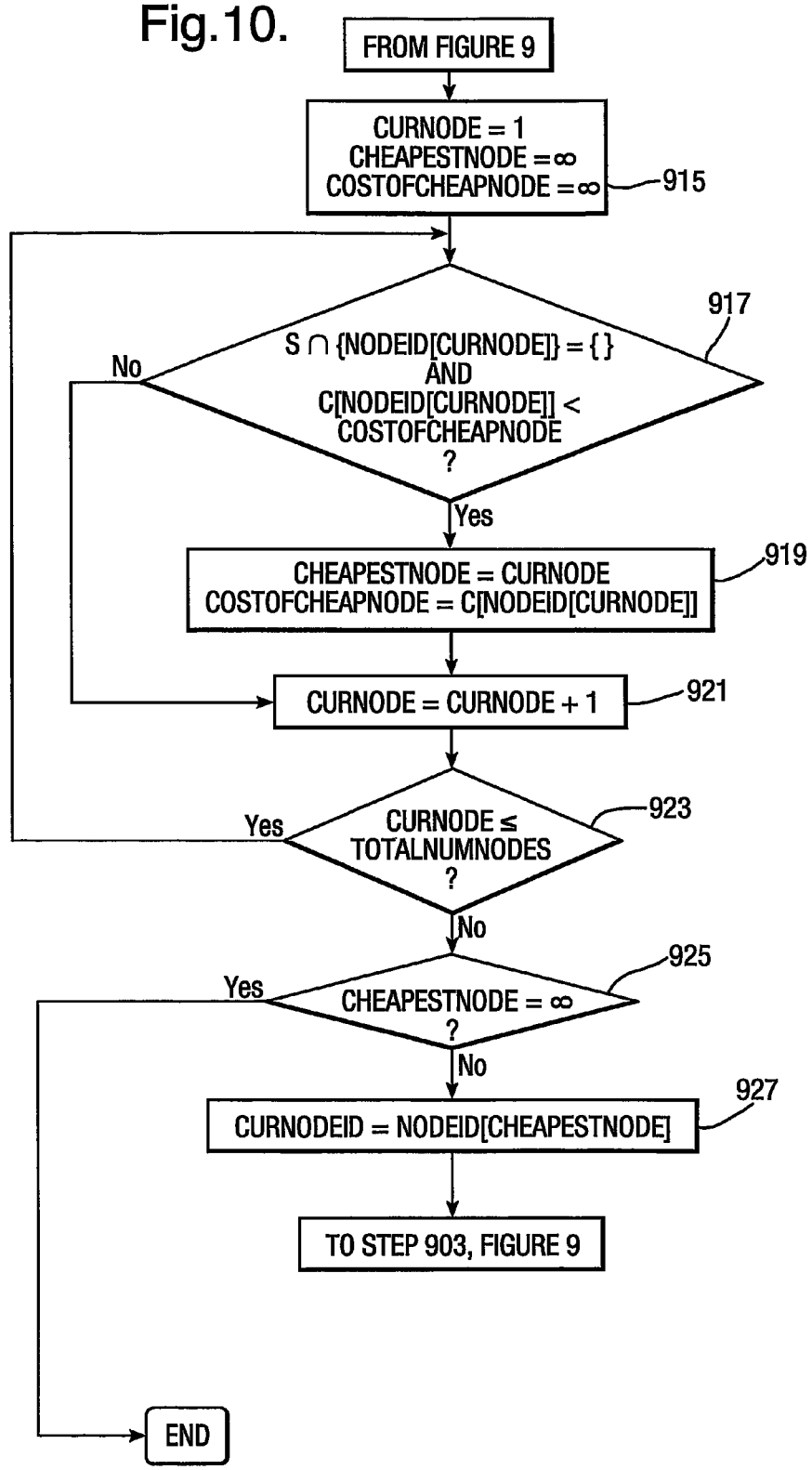

Referring to FIG. 9, in step 901 the set S is initialized to an empty set (i.e. { }) and the array C[NODEID] is initialized so that the cost of the path to all nodes is ∞. The algorithm starts with the first node in the path (i.e. PATHSTART) and keeps track of the node that it is examining with the variable CURNODEID. The algorithm sets PATH[CURNODEID] to {PATHSTART} and sets C[CURNODEID] to 0 (step 901).

The algorithm keeps track of the link that it is examining with the variable CURINTFACE. In order to examine the first link attached to CURNODEID, the algorithm then sets CURINTFACE to 1 and adds CURNODEID to set S (step 903). The NODEID of the node at the other end of the link CURINTFACE currently being examined is then calculated (step 905).

In preferred embodiments, the viability check described above is now carried out (step 906). It is to be noted, however, that the Path Selection algorithm can be run without performing the viability check in which case step 906 would be skipped and the algorithm would proceed with step 907, which will be described below. If the path including the link currently being examined is not viable (i.e. it fails the viability check) the algorithm then proceeds to increment CURINTFACE by 1 (step 911), check whether all the links attached to CURNODEID have been examined (step 913) and if there are more links to examine, repeating steps 905 and 906. If, on the other hand, the path including the link currently being examined is viable (i.e. it passes the viability check) then the algorithm proceeds with step 907.

In step 907, a test is carried out to check if the sum of the cost to the current node being examined (C[CURNODEID]) and the cost of the current link being examined (LINKCOST[CURNODEID][CURINTFACE]) is less than the current cost to the remote node attached to the other end of the link (C[REMOTENODEID]). If the result of the test is affirmative, in step 909 the algorithm sets the cost to the remote node to the sum of the cost to the current node plus the cost of the current link (i.e. C[REMOTENODE]=C[CURNODEID]+LINKCOST[CURNODEID][CURINTFACE]) and it sets the shortest path to the remote node to the path to the current node plus the remote node (i.e. PATH[REMOTENODE]=PATH[CURNODEID]+{REMOTENODE}). The algorithm then proceeds to increment CURINTFACE by 1 (step 911), check whether all the links attached to CURNODEID have been examined (step 913) and if there are more links to examine, repeating steps 905 to 911. If the result of the test in step 907 is ever negative, then the variables C[REMOTENODE] and PATH[REMOTENODE] do not need updating because they already hold the lowest cost and the shortest path to the remote node being examined. In this case, the algorithm jumps to step 911 and proceeds as described above.

When all the links attached to the current node have been examined, i.e. the result of the test in step 913 is negative, the algorithm searches through all the other nodes in the network in turn to decide which node to examine next. The node that is examined next by the algorithm is the node with the lowest cost that has not already been examined, i.e. the node that has the lowest values of C[ ] which is not already included in set S. This process is described below with reference to FIG. 10.

Three temporary variables are used in this iterative search through all the other network nodes: CURNODE (keeps track of the node currently being investigated CHEAPESTNODE (keeps track of the node currently believed to have the lowest cost) and COSTOFCHEAPNODE (keeps track of the cost to CHEAPESTNODE). In step 915, these three variables are initialized.

A test is performed in step 917 to check that: (1) the current node has not already been examined, i.e. is node CURNODE a member of set S; and (2) the current node has the lowest cost, i.e. is the cost to CURNODE less than COSTOFCHEAPNODE. If both of these conditions are satisfied then the node currently being examined becomes the node with the lowest cost, i.e. CHEAPESTNODE is set to CURNODE and COSTOFCHEAPNODE is set to C[NODEID[CURNODE]] (step 919). The algorithm then proceeds to increment CURNODE by 1 (step 921), check whether all the nodes have been investigated (step 923) and if there are more nodes to investigate, repeating steps 917 to 921. If one of the conditions in the test is not satisfied, i.e. if the current node has already been examined (is a member of set S) or if the cost associated with it is not less than COSTOFCHEAPNODE, then the variables CHEAPESTNODE and COSTOFCHEAPNODE do not need updating. In this case, the algorithm jumps to step 921 and proceeds as described above.

When all the nodes in the network have been investigated in order to determine which node to examine next, i.e. the result of the test in step 923 is negative, the algorithm checks the value of the CHEAPESTNODE variable (step 925). If the value of the CHEAPESTNODE variable is not ∞, then the iterative search has resulted in a node to examine next. The variable CURNODEID is set to the cheapest node (step 927), (i.e. CURNODEID=NODEID[CHEAPESTNODE]) and steps 903 to 925 are repeated.

However, if the value is ∞ then the algorithm has not found any node in the network that satisfies the conditions of the test in step 917, i.e. all the nodes in the network have been examined. In this case the path selection algorithm ends since it has calculated the shortest path from node PATHSTART to every other node in the network. At the conclusion of the path selection algorithm, the selected path is held in PATH[PATHEND] and the cost of that selected path is held in C[PATHEND].

When the path selection algorithm is run in the network of FIG. 1, and assuming that the path to be selected starts at node A and ends at node F (i.e. PATHSTART=A and PATHEND=F), the C[ ] table and the PATH[ ] table would be built up as follows:

| NODEID | A | B | C | D | E | F |
|---|---|---|---|---|---|---|
| | | | Initially: | | | |
| | | | S = { } | | | |
| C[NODEID] | ∞ | ∞ | ∞ | ∞ | ∞ | ∞ |
| PATH[NODEID] | { } | { } | { } | { } | { } | { } |
| | | | CURNODEID = PATHSTART = A | | | |
| | | | S = {CURNODEID} = {A} | | | |
| C[NODEID] | 0 | 0.2 | ∞ | 1.0 | 0.5 | ∞ |
| PATH[NODEID] | {A} | {A, B} | { } | {A, D} | {A, E} | { } |
| | | | CURNODEID = B | | | |
| | | | S = S + {CURNODEID} = {A, B} | | | |
| C[NODEID] | 0 | 0.2 | 0.45 | 1.0 | 0.5 | ∞ |
| PATH[NODEID] | {A} | {A, B} | {A, B, C} | {A, D} | {A, E} | { } |

-continued

| NODEID | A | B | C | D | E | F |
|---|---|---|---|---|---|---|
| CURNODEID = C    S = S + {CURNODEID} = {A, B, C} | | | | | | |
| C[NODEID] | 0 | 0.2 | 0.45 | 1.0 | 0.5 | 0.95 |
| PATH[NODEID] | {A} | {A, B} | {A, B, C} | {A, D} | {A, E} | {A, B, C, F} |
| CURNODEID = E    S = S + {CURNODEID} = {A, B, C, E} | | | | | | |
| C[NODEID] | 0 | 0.2 | 0.45 | 0.8333 | 0.5 | 0.8333 |
| PATH[NODEID] | {A} | {A, B} | {A, B, C} | {A, E, D} | {A, E} | {A, E, F} |
| CURNODEID = D    S = S + {CURNODEID} = {A, B, C, E, D} | | | | | | |
| C[NODEID] | 0 | 0.2 | 0.45 | 0.8333 | 0.5 | 0.8333 |
| PATH[NODEID] | {A} | {A, B} | {A, B, C} | {A, E, D} | {A, E} | {A, E, F} |
| CURNODEID = F    S = S + {CURNODEID} = {A, B, C, E, D, F} | | | | | | |
| C[NODEID] | 0 | 0.2 | 0.45 | 0.8333 | 0.5 | 0.8333 |
| PATH[NODEID]    END | {A} | {A, B} | {A, B, C} | {A, E, D} | {A, E} | {A, E, F} |

Therefore, at the conclusion of the path selection algorithm:

Selected Path=PATH[PATHEND]=PATH[F]={A,E,F}
Cost of Selected Path=C[PATHEND]=C[F]=0.8333.

An advantage of using the above path selection algorithm is that each time a wavelength on a link is used, the cost/metric of the link changes, i.e. it is 'dynamic'. This is because the cost/metric is itself a function of the number of wavelengths available on a given link. Therefore multiple connection attempts between the same pair of end points do not necessarily take identical paths through the network. If a 'static' cost/metric is used (i.e. one that does not change each time a wavelength is assigned, e.g. some function of bandwidth available on the link), as is the case of many known Shortest Path First (SPF) algorithms, then an overload can occur where the same path is used for all connections between a pair of end points until the capacity of one of the links along that path is exhausted. Using a cost/metric that is based on the usage of the link allows more connections to be made for the same amount of fibre/wavelengths and also gives benefits when a link fails. This is because using a cost/metric based on the usage of the link tends to spread wavelength usage more evenly across the network than 'static' cost/metrics. Therefore if a link were to fail it is likely to be carrying fewer connections since the algorithm spreads connections more evenly across the network, and therefore results in fewer connection re-routes being required in response to the failure.

The Wavelength Selection algorithm will now be described in more detail. The variables listed below are used in the description of the Wavelength Selection algorithm and the associated flow charts in FIGS. 11 to 13.

E2EWAVELENGTHS—Holds a bit vector describing the wavelengths available for use end-to-end along the selected path.

PATHNODEID[I]—Holds the NODEID for the $I^{th}$ node on the selected path.

PATHINT[I]—Holds the link number for the $I^{th}$ link on the selected path.

WAVELENGTHS[NODEID][INTFACE]—Holds a bit vector describing the wavelengths available for use on the link INTFACE on node NODEID.

PATHLENGTH—Holds the number of nodes on the selected path.

WAVELENGTHCOUNTER[WAVELENGTH]—Holds the number of times the wavelength WAVELENGTH 'touches' the selected path.

INTERFACES[NODEID]—Holds the number of links that are attached to node NODEID.

WAVELENGTHSONLINK—Holds a bit vector describing the wavelengths available for use on a selected link.

WAVELENGTHSONLINK[WAVELENGTH]—Holds the value 1 if wavelength WAVELENGTH is available for use on a selected link or holds the value 0 if wavelength WAVELENGTH is not available for use.

E2EWAVELENGTHS[WAVELENGTH]—Holds the value 1 if wavelength WAVELENGTH is available for use end-to-end along the selected path (i.e. if wavelength WAVELENGTH is included in bit vector E2EWAVELENGTHS) or holds the value 0 if wavelength WAVELENGTH is not available for use end-to-end.

TOTALWAVELENGTHSSUPPORTED—Holds the maximum number of wavelengths allowed on a single link.

MOSTUSEDINDEX—At the end of the Wavelength Selection algorithm, MOSTUSEDINDEX holds the wavelength that 'touches' the selected path most often, i.e. the wavelength that the algorithm has selected for use end-to-end along the selected path.

After the path has been selected (using the Path Selection algorithm as described above or by using an alternative path selection algorithm), the Wavelength Selection algorithm calculates which wavelengths are available end-to-end along the selected path (i.e. which wavelengths meet the wavelength continuity constraint) and stores the result in the E2EWAVELENGTHS bit vector.

Figure 11:
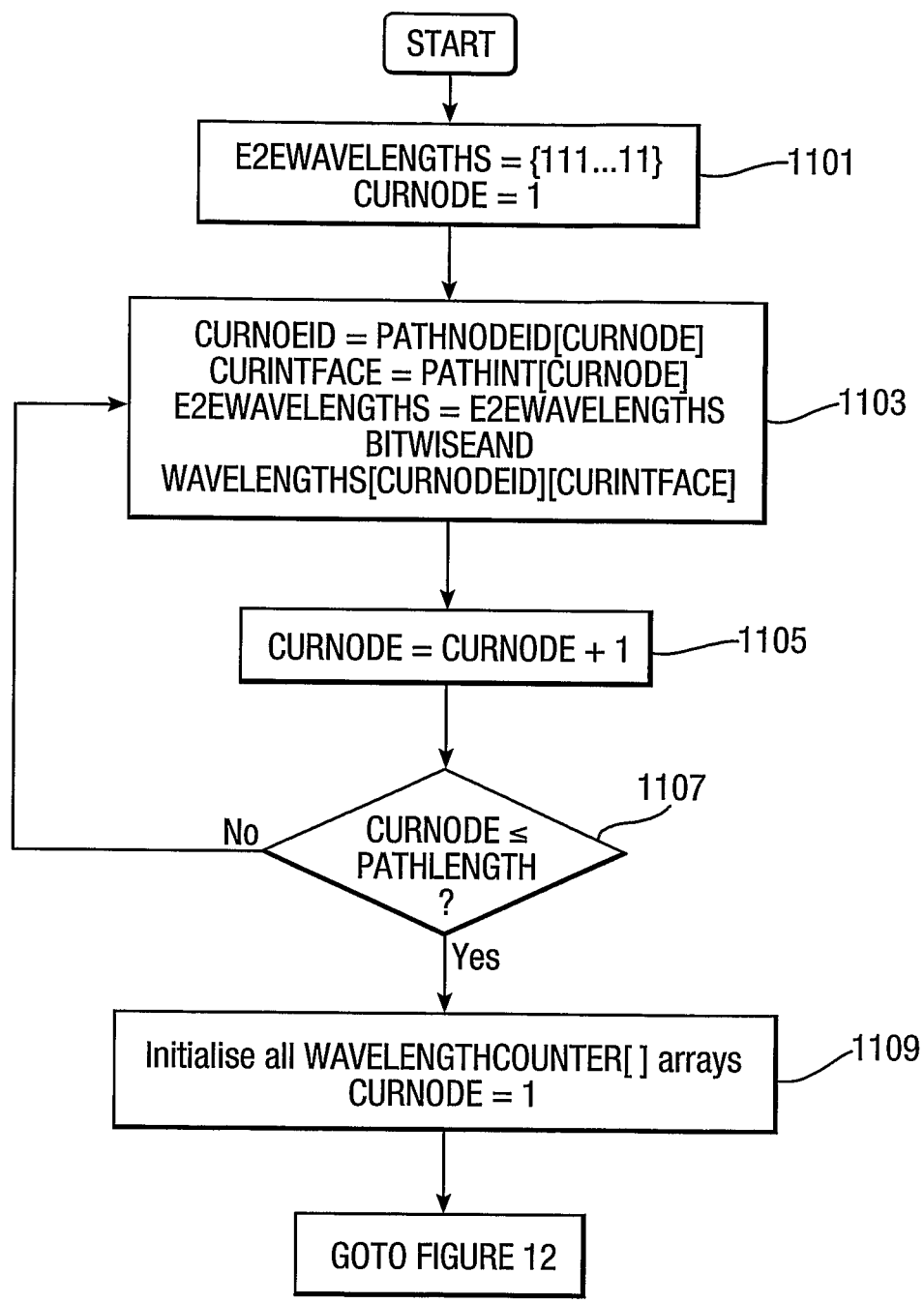
Figure 12:
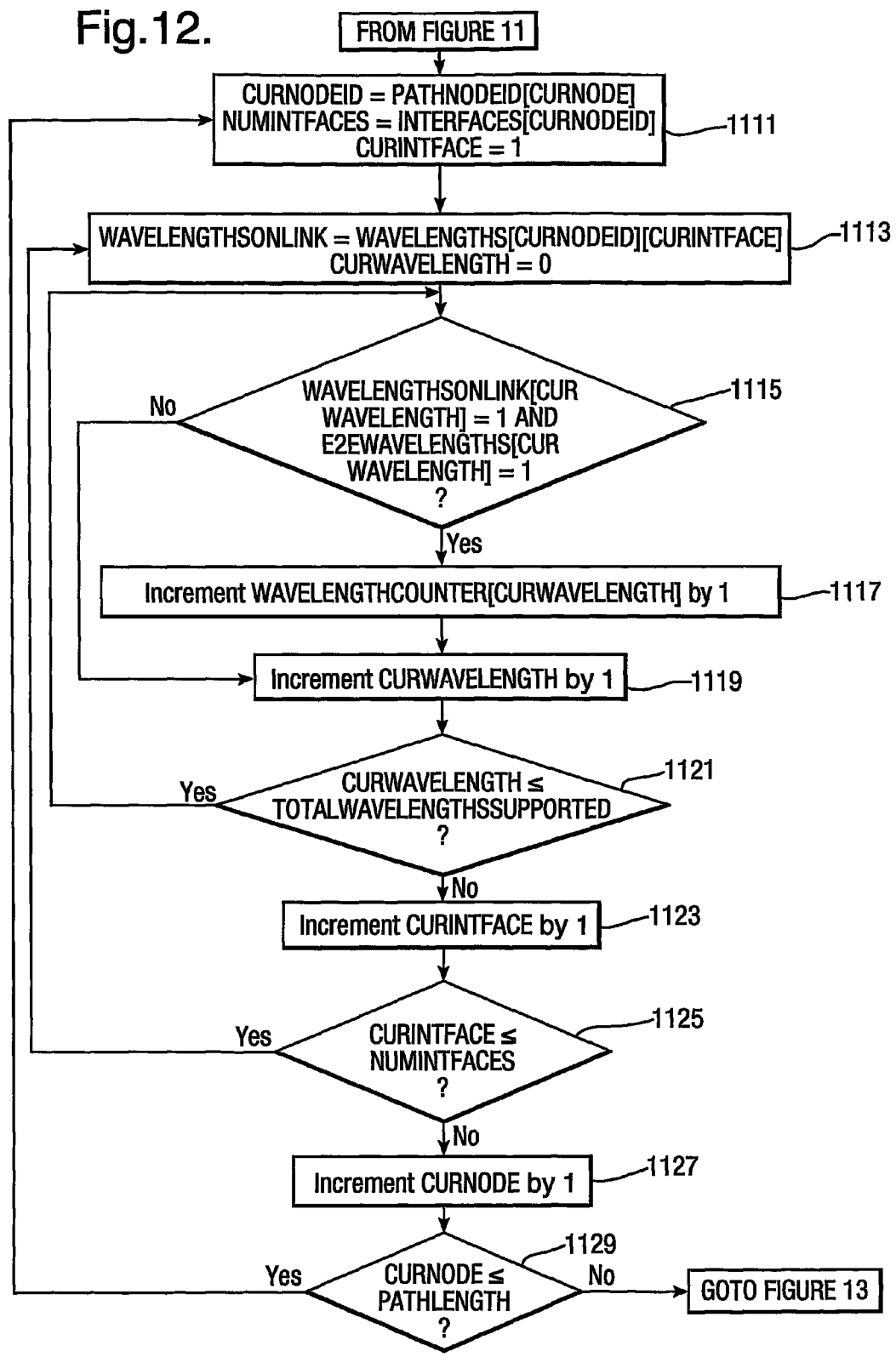

To this end, referring to step 1101 in FIG. 11, the algorithm initially assumes that all wavelengths are available end-to-end (i.e. E2EWAVELENGTHS={111 . . . 11}. The algorithm also initializes a counter CURNODE by setting it to 1. The counter CURNODE keeps track of the node and link currently being examined by the algorithm.

Thus, starting with the first node and link on the selected path, the algorithm updates the E2EWAVELENGTHS bit vector (step 1103) so that it describes only those wavelengths that are available both on current link of the selected path AND end-to-end along the selected path, i.e. E2EWAVELENGTHS=E2EWAVELENGTHS BITWISE-AND WAVELENGTHS[CURNODEID][CURINTFACE].

Then, in step 1105, the algorithm increments the counter CURNODE by 1 and in step 1107, a test is performed to check whether all nodes along the selected path have been examined. If not, steps 1103 to 1107 are repeated. If all nodes along the selected path have been examined then the algorithm proceeds to initialize all the WAVELENGTHCOUNTER [WAVELENGTH] tables and resets the counter CURNODE to 1 (step 1109).

The Wavelength Selection algorithm then proceeds to examine all the links that are attached to each node along the selected path. This process will be described with reference to FIG. 12.

In step 1111, the algorithm finds the number of links that are attached to the current node, stores the value as the variable NUMINTFACES and initializes the counter CURINT-FACE, which is used to keep track of the link currently being examined by the algorithm.

In step 1113, the algorithm calculates which wavelengths are available for use on the current link, stores the result as the variable WAVELENGTHSONLINK and initializes the counter CURWAVELENGTH, which is used to keep track of the wavelength currently being examined by the algorithm.

A test is then performed (step 1115) to check whether the current wavelength is available on the current link AND available end-to-end along the selected path. If the result of the test is positive, the WAVELENGTHCOUNTER[WAVE-LENGTH] table for the current wavelength is incremented by 1 (step 1117) and the CURWAVELENGTH counter is incremented by 1 (step 1119). If the result of the test is negative (i.e. one or neither of the conditions in the test is not satisfied), then the algorithm jumps ahead and only increments the CURWAVELENGTH counter (step 1119).

A further test is then performed (step 1121) to check whether all the wavelengths on the current link have been examined. If the result of the test indicates that there are more wavelengths to examine then steps 1115 to 1121 are repeated for each wavelength. If the result of the test indicates that there are no more wavelengths to examine on the current link then the CURINTFACE counter is incremented by 1 (step 1123).

Another test is then performed (step 1125) to check whether all the links attached to the current node have been examined. If the result of the test indicates that there are more links to examine then steps 1113 to 1125 are repeated for each link. If the result of the test indicates that there are no links attached to the current node left to examine then the CURN-ODE counter is incremented by 1 (step 1127).

Another test is then performed (step 1129) to check whether all the nodes on the selected path have been examined. If the result of the test indicates that there are more nodes to examine then steps 1111 to 1129 are repeated for each node. When the result of the test indicates that there are no nodes left to examine, the WAVELENGTHCOUNTER [WAVELENGTH] tables are iterated through and the end-to-end wavelength that is available on the most links attached to the selected path is chosen as the end-to-end wavelength that is to be used. This iteration process will now be described with reference to FIG. 13.

In step 1131, the MOSTUSEDINDEX variable is initialized and set to 1 whilst the CURWAVELENGTH counter is reset to 1. A test is then performed (step 1133) to check whether the current wavelength occurs on more links than the wavelength currently stored by the MOSTUSEDINDEX variable. If the result of the test is positive (i.e. WAVE-LENGTHCOUNTER[CURWAVELENGTH]>WAVE-LENGTHCOUNTER[MOSTUSEDINDEX]) then the MOSTUSEDINDEX is updated so that it stores the current wavelength (step 1135) and the CURWAVELENGTH counter is then incremented by 1 (step 1137). If the result of the test is negative then the algorithm skips to step 1137 and the CURWAVELENGTH counter is incremented by 1.

A further test is then performed (step 1139) to check whether all the wavelengths have been examined. If the result of the test indicates that there are more wavelengths to examine then steps 1133 to 1139 are repeated for each wavelength. The Wavelength Selection algorithm ends if the result of the test indicates that there are no more wavelengths to examine.

When the Wavelength Selection algorithm is run in the network of FIG. 1, and assuming that the path A-E-F has already been selected by a path selection algorithm, the WAVELENGTHCOUNTER[ ] tables would be built up as follows:

---

E2EWAVELENGTHS = {11111} [Initially all wavelengths are assumed to be available]

E2EWAVELENGTHS = E2EWAVELEGTHS BITWISEAND

WAVELENGTHS[NODEA][LINK A – B]

{11111}BITWISEAND{00101}

{00101}[NODE A, Link A – E processed]

E2EWAVELENGTHS = E2EWAVELEGTHS BITWISEAND

WAVELENGTHS[NODEB][LINKB – C]

{00101}BITWISEAND{00111}

{00101}[NODE E, Link E – F processed]

E2EWAVELENGTHS = {00101} [i.e. wavelength numbers 1, 2 and 4 are not available end to end]
WAVELENGTHCOUNTER[1] = 0
WAVELENGTHCOUNTER[2] = 0
Etc.

---

Initial WAVELENGTHCOUNTER table:

| Wavelength Number | Cumulative Occurrences | Notes |
|---|---|---|
| 1 | 0 | |
| 2 | 0 | |
| 3 | 0 | |
| 4 | 0 | |
| 5 | 0 | |

Process links attached to Node A (first node in path):

| Wavelength Number | Cumulative Occurrences | Notes |
|---|---|---|
| 1 | 0 | Wavelength is not incremented as it is not available end to end across the path A-E-F. |
| 2 | 0 | Wavelength is not incremented as it is not available end to end across the path A-E-F. |
| 3 | 2 | Available on A-B & A-E |
| 4 | 0 | Wavelength is not incremented as it is not available end to end across the path A-E-F. |
| 5 | 2 | Available on A-B & A-E |

Process links attached to Node E (second node in path):

| Wavelength Number | Cumulative Occurrences | Notes |
|---|---|---|
| 1 | 0 | |
| 2 | 0 | |
| 3 | 5 | Available on E-A, E-D & E-F |
| 4 | 0 | |
| 5 | 5 | Available on E-A, E-C & E-F |

Process links attached to Node F (third/last node in path):

| Wavelength Number | Cumulative Occurrences | Notes |
|---|---|---|
| 1 | 0 | |
| 2 | 0 | |
| 3 | 6 | Available on F-E |
| 4 | 0 | |
| 5 | 7 | Available on F-C & F-E |

After the links that are attached to the last node in the path have been processed the WAVELENGTHCOUNTER tables are iterated through and the wavelength that occurs the most often is selected. Therefore, in this example wavelength number 5 (WAVELENGTHCOUNTER[5]) is selected and used.

It should be noted that selecting the wavelength that occurs the most often is not essential to achieve the advantages of the present invention. For example, in a network that can support up to 160 wavelengths per optical fibre link, selecting the wavelength that occurs the second, or third most number of times, or selecting the wavelength that is available on most of the links attached to the nodes on the path would be effective. Indeed, any wavelength that is more available than other wavelengths would be beneficial.

In the case where several wavelengths have the same availability (i.e. they are available on the same number of links) then the first wavelength (of those wavelengths with equal availability) is selected, where the first wavelength is the lowest numbered wavelength, i.e. if wavelengths 3 and 5 were equally available, wavelength 3 would be selected.

As already discussed, the advantage of using the above described method is that better decisions about which wavelength to select can be made by considering how a wavelength selection decision will affect future connection attempts along paths that use one or more of the links along the path for which the wavelength is being selected. If, in the example network of FIG. 1, a wavelength was needed for use in transmitting optical data along the path AEF, and the first available wavelength was selected, wavelength 3 would be selected. Now consider the situation where a connection is required along the path DEF. As a consequence of the previous choice of wavelength (wavelength 3 being selected) no path can be provisioned between nodes D and F (since the only wavelength that is available end-to-end along the entire path DEF is wavelength 3 and it is already in use along link EF). Hence the connection attempt is blocked. Using the Wavelength Selection algorithm according to the present invention would result in wavelength 5 being selected because it is widely available on the links attached to the nodes A, E and F. In this situation, the connection attempt along the path DEF will not be blocked because wavelength 3 can be selected.

It is to be noted that the end-to-end viability check, path selection algorithm and wavelength selection algorithm can be used in combination or separately. Indeed, each can be used independently. For example, it is possible to use any known path selection algorithm (e.g. any known shortest path first or constrained shortest path first algorithm) and/or any known wavelength selection algorithm with the end-to-end viability check as described above. Alternatively, the path selection and wavelength selection algorithms as described above could be used together or independently, with or without the end-to-end viability check. Other combinations will be apparent to one skilled in the art.

It will be apparent to from the foregoing description that many modifications or variations may be made to the above described embodiments without departing from the invention.

A digital data carrier carrying a program of instructions (e.g., such as a storage medium having recorded therein processor-readable code) executable by processing apparatus may perform the method of this invention as such instructions are executed by the processor.

The invention claimed is:

1. A machine-implemented method of selecting a wavelength for use in transmitting optical data along an end-to-end path in an optical network, said optical network comprising a plurality of nodes interconnected by optical fiber links, said method comprising using a digital signal processor configured to effect:
finding wavelengths available for use along said end-to-end path;
finding wavelengths available on each link attached to each node on said end-to-end path, wherein the links include first links attached to each node and forming said end-to-end path and second links attached to each node and not forming said end-to-end path;
selecting a wavelength for use (a) that is available on the first links of said end-to-end path and (b) that is more available on the second links attached to the nodes on said end-to-end path than other wavelengths, thereby considering future attempts to set up other end-to-end paths having at least one node in common with said end-to-end path.

2. A method according to claim 1, further comprising selecting said end-to-end path using a shortest path first algorithm prior to finding wavelengths available far use along said end-to-end path.

3. A method according to claim 2, Wherein a metric used in said algorithm is related to wavelength usage on the links.

4. A method according to claim 2, wherein the selecting of said path comprises extending said path one link at a time.

5. A method according to claim 4, further comprising performing an end-to-end viability check on the path including a proposed link before extending the path with said proposed link.

6. A method according to claim 5, wherein said viability check is based on optical characteristics of said path.

7. A method according to claim 6, wherein said viability check determines if the end-to-end optical loss of the path including a proposed link is acceptable.

8. A node for use in an optical network, said optical network comprising a plurality of nodes interconnected by optical fiber links, said node comprising:
finding means for finding wavelengths available for use in transmitting optical data along an end-to-end path in said optical network and finding wavelengths available on each optical fiber link attached to each node on said path, wherein each optical fiber link attached to each node on said path is one of a first link or a second link, wherein a first link forms a part of the end-to-end path and a second link does not form a part of the end-to-end path; and selecting means for selecting a wavelength for use that is (a) available cm the first links forming the end-to-end path and that (b) has an availability on second links attached to the nodes on said end-to-end path that is at least equal to the availability of other wavelengths on the second links attached to nodes on said end-to-end path such that future attempts to set up other end-to-end paths having at least one node in common with said end-to-end path are considered.

9. A node for use in an optical network, said optical network comprising a plurality of nodes interconnected by optical fiber links, said node comprising:

a storage medium having, recorded therein processor readable code processable to select wavelength for use in transmitting optical data along a path in said optical network, said code comprising:

wavelength finding code processable to:
find wavelengths available for use along an end-to-end path;
find wavelengths available on each link attached to each node on said end-to-end path, each link being a first link attached to a node and forming said end-to-end path or a second link attached to a node and not forming said end-to-path;

wavelength selection code processable to select a wavelength that (a) is available on the first links of the end-to-end path and that (b) is more available on the second links attached to the nodes on said end-to-curl path than other wavelengths, to consider future attempts to set up other end-to-end paths having at least one node in common with said end-to-end path.

10. A node according to claim 8, wherein said node comprises a node on said path.

11. A node according to claim 10, wherein said node comprises an ingress node of said path.

12. An optical network comprising a plurality of nodes interconnected by optical fiber links, wherein one or more of said nodes comprises a node according to claim 8.

13. A method as in claim 1, wherein the selected wavelength has maximum availability on said links if a maximum availability value is presented.

14. A node as in claim 8, wherein the selected wavelength has maximum availability on said links if a maximum availability value is presented.

15. A node as in claim 9, wherein the selected wavelength has maximum availability on said links if a maximum availability value is presented.

16. A machine-implemented method of selecting a wavelength for use in transmitting optical data along an end-to-end path in an optical network, said optical network comprising a plurality of nodes interconnected by optical fiber links, said method comprising:

(a) finding wavelengths available for use along said end-to-end path;
(b) finding wavelengths available on each link attached to each node on said end-to-end path, each link attached to each node being a first link forming said end-to-end path or a second link not forming said end-to-end path; and
(c) selecting a wavelength for use that is (i) available on the first links of said end-to-end path and (ii) that has an availability on the second links attached to the nodes on said end-to-end path that is at least equal to the availability of other wavelengths on said second links attached to nodes on said end-to-end path for future attempts to set up other end-to-end paths having at least one node in common with said end-to-end path.

* * * * *